United States Statutory Invention Registration [19]

[11] Reg. Number: H241

Duffy [43] Published: Mar. 3, 1987

[54] PROGRAMMABLE TELEMETRY WORD SELECTOR

[75] Inventor: Harold A. Duffy, Ridgecrest, Calif.

[73] Assignee: The United States of America as represented by the Secretary of the Navy, Washington, D.C.

[21] Appl. No.: 776,550

[22] Filed: Sep. 16, 1985

[51] Int. Cl.[4] ..... G06F 7/04

[52] U.S. Cl. ..... 340/825.3; 340/825.52; 364/900

[56] References Cited

U.S. PATENT DOCUMENTS

| | | | |
|---|---|---|---|
| 3,776,499 | 10/1973 | Helf, Jr. et al. | 340/172.5 |
| 4,296,409 | 10/1981 | Whitaker et al. | 364/684 |
| 4,389,710 | 6/1983 | Rasmussen | 340/551 |
| 4,397,021 | 8/1983 | Lloyd et al. | 371/20 |
| 4,493,045 | 1/1985 | Hughes, Jr. | 364/580 |
| 4,517,637 | 5/1985 | Cassell | 364/138 |

*Primary Examiner*—S. C. Buczinski
*Assistant Examiner*—Linda J. Wallace
*Attorney, Agent, or Firm*—Robert F. Beers; W. Thom Skeer; Stephen J. Church

[57] ABSTRACT

A programmable telemetry word selector includes a scanning memory storing, for each of a number of analog outputs of the selector, a variable identifying tag and a data conversion code for the variable. The selector is constructed to compare the stored tags with successive tag words provided by a telemetry data compressor and, when a match is found, perform on a corresponding data word from the compressor digital data conversions specified by the code and direct the result to the corresponding analog output. The word selector is constructed to perform the scanning, digital conversion steps, and analog conversion concurrently so as to handle tags and data provided relatively rapidly by the compressor. The selector includes a storage memory for a plurality of sets of the scanning memory contents and has a microcomputer for generating and modifying the sets to reconfigure the selector for different tests providing telemetered data.

7 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LATCH
LATCH
COMPRESSOR
COMPARATOR
ADDRESS COUNTER
TTL RAM
MUX
35
36
21
22
20
12
56
57
66
48
47
44
45
42
40
54
51
52
53
113

DIGITAL FM
PCM
PAM
DATA COMPRESSOR
WORD SELECTOR
WORD SELECTOR
RECORDER
RECORDER
15
14
13
12
10
10
30
30
32
32
20
21
22
24
24
24

PROGRAMMABLE TELEMETRY WORD SELECTOR

BACKGROUND OF THE INVENTION

1. Field of the Invention

This invention pertains to the field of electrical communications, more particularly the field of continuous variable indication or telemetering, and to the field of electrical computers and data processing systems, more particularly the field of measuring, testing, or monitoring systems having programmed testing conditions.

2. Description of the Prior Art

In a typical telemetry station, digital data representing periodically sampled measurements of a number of variables is received serially from a relatively small number of carrier frequencies in successive frames each having a synchronization word followed by a predetermined number of data words corresponding to individual variables. Each frame is decommutated into successive parallel data words each representing one sample of a variable. The parallel words are directed by a demultiplexer to analog conversion providing an analog output for each variable. The output is directed to a pen of a recorder. Different tests providing telemetered data have different frame formats and use the same pen for different variables having different ranges and transmitted by a different modulation type and/or different digital arithmetic format.

As a result, a telemetry system must be reconfigured, at least partially, for each test. In prior art telemetry systems, patch panels and the like are used to direct digital and analog data and to select limited arithmetic format conversions. The necessary patch panel rewiring between tests is time consuming and error prone. Since the configuration for every test is different, it is not practical to maintain completely wired panels and extensive rewiring is frequently required even for similar but not consecutive tests. Programmable digital devices have been developed for data flow direction and conversion in telemetry systems, but such existing such devices provide limted data conversion, are not adapted for use with data arriving at high speed, or have volatile memories requiring reprogramming for every test.

The limited data range and format conversions available in existing telemetry systems frequently require recalibration of individual recorder pens to provide a desirable range of pen movement for different variables. This recalibration is another time consuming process which must be redone for each test.

The prior art includes data compressors for use with telemetry systems in which rapidly arriving data is stored for later analysis by a relatively powerful digital computer. Such a compressor receives successive decommutated parallel data words and is programmable to associate each data word with a tag word identifying the corresponding variable. The compressor provides a parallel output of corresponding tag and data words together with a strobe signal substantially as the data words are received by the compressor. Such a compressor is adapted for data compression by ignoring consecutive unchanged values of the same variable, but also provides a "throughput mode" in which every data word is output with its tag word. Typically, the programming of existing data compressors for tag and data association is involved and data format and range conversion is not provided.

SUMMARY OF THE INVENTION

The invention is concerned with a programmable telemetry word selector in which tags corresponding to analog outputs of the selector and stored in a high speed scanning memory are compared with tag words from a telemetry data compressor. The selector is constructed to capture the corresponding data word from the compressor when a tag match occurs and to perform shifting, scaling, and arithmetic format conversions on the captured word as specified by a code stored in the scanning memory along with each tag. The contents of the scanning memory to configure the selector for a plurality of tests providing telemetered data are stored in a nonvolatile memory after generation or modification, as by an integral microcomputer, for transfer to the scanning memory.

It is an object of the subject invention to provide a programmable telemetry word selector for convenient and rapid reconfiguration of a telemetry system for different tests.

Another object is to provide such a word selector which provides a wide variety of data format and range conversions.

Another object is to provide such a word selector useable to capture and convert data issuing a rapid rate from an existing telemetry data compressor.

A further object is to provide such a word selector which retains programming to select a variety of telemetry test configurations and is adopted to conveniently generate the programming and to modify it for similar tests.

BRIEF DESCRIPTION OF THE DRAWINGS

Other objects, advantages, and novel features of the subject invention will become apparent from the following detailed description thereof when considered with the accompanying drawings in which.

DESCRIPTION OF THE PREFERRED EMBODIMENT

Figure 1:
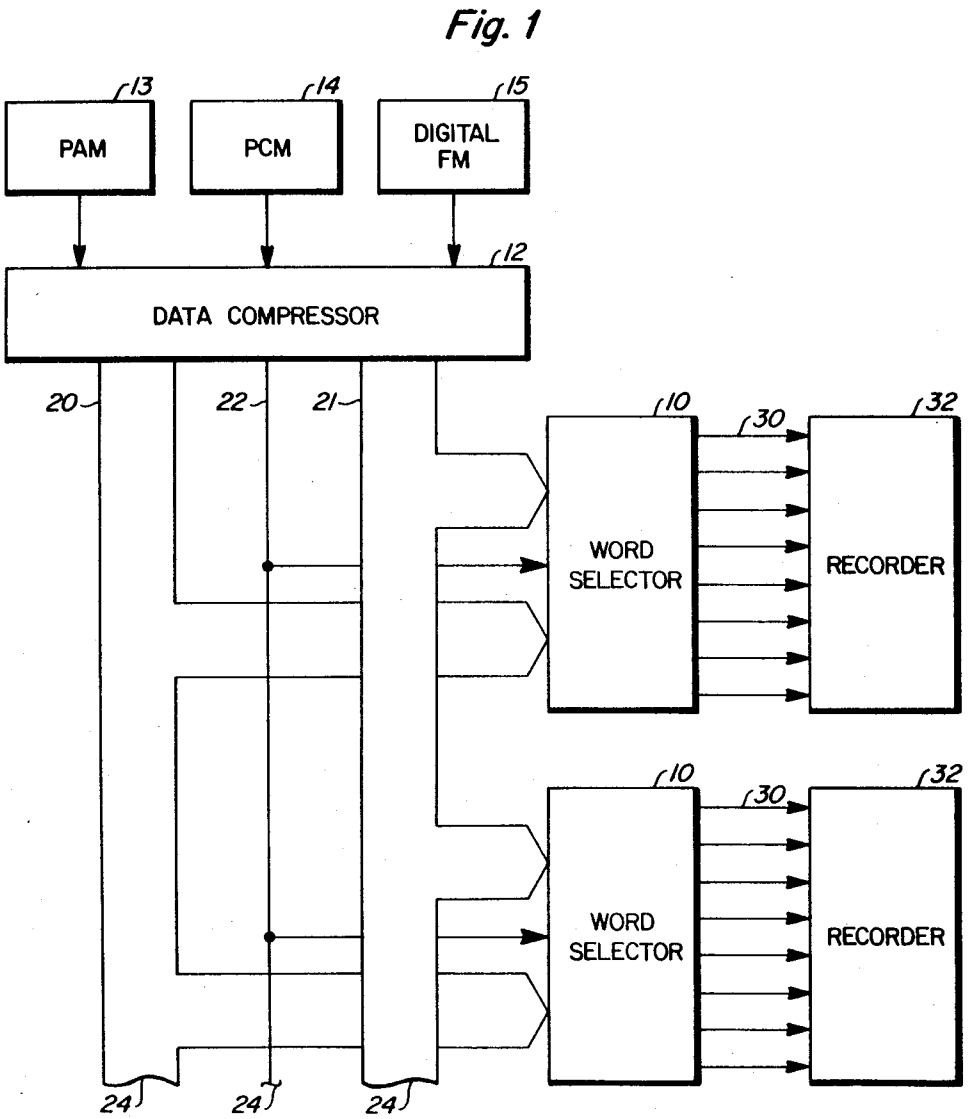
FIG. 1 is a block diagram of a telemetry system having a pair of word selectors embodying the subject invention.
Figure 2:
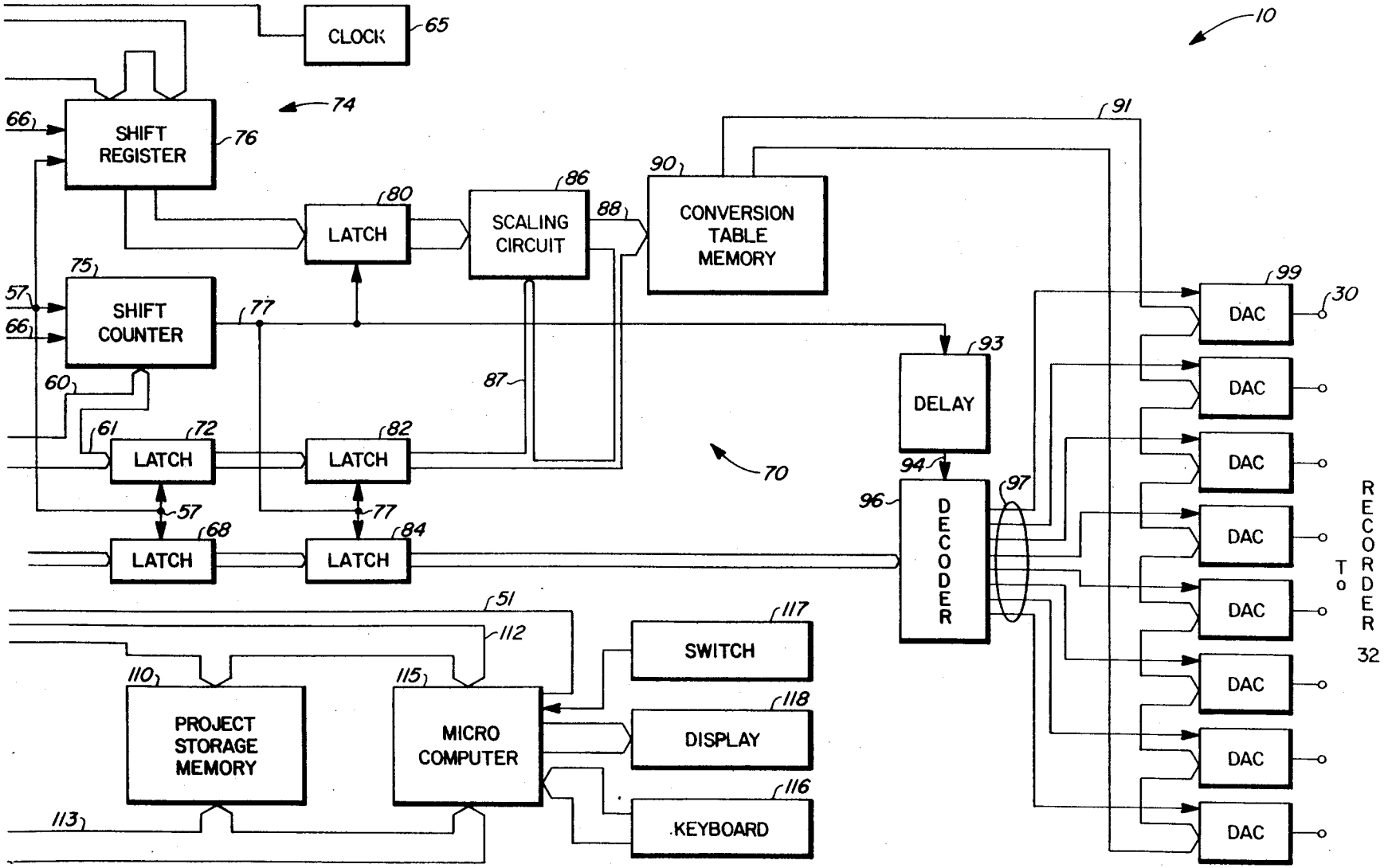

FIG. 1 depicts a telemetry system which is a representative operating environment for two telemetry word selectors 10 embodying the principles of the subject invention. The telemetry system includes a data compressor 12, such as the EMR 714–2, of well known construction. Compressor 12 is depicted as receiving digital data from a pulse amplitude modulation (PAM) receiver 13, a pulse code modulation receiver (PCM) 14, and a digital frequency modulation (FM) receiver 15. As is well known to those in the telemetry art, compressor 12 may receive data from other arrangements of such receivers, typically through well-known decommutators, not shown.

Compressor 12 is connected to a tag bus 20, and a data bus 21, and a hand shake or scan request conductor 22. The buses, typically, are 16 bit parallel and provide binary digital signals, the presence of a valid data signal in bus 21 together with a corresponding valid tag signal on bus 20 being indicated by a signal on conductor 22. Compressor 12 periodically provides on bus 20 successive data words from a plurality of variable or data sources from which measurements are being obtained by the system of FIG. 1. As compressor 12 provides each data word for bus 21, a tag word is provided on bus 20 identifying the one of such sources which provided the data represented by the current data word on bus 21. When used with a selector 10 of the subject invention, compressor 12 is connected in a well-known throughput mode in which every data word from receivers 13 through 15 is output on bus 21 with the corresponding tag word on bus 20, typically at a rate typically, up to 400 KHz. These buses are connected to each of the selectors 10 as shown in FIGS. 1 and 2 and may be continued, as indicated in FIG. 1 by numeral 24, to one or more additional selectors similar to one of the selectors 10.

The system of FIG. 1 accepts a number of analog signals 30. Typically, eight signals are accepted for each of the selectors 10 as shown in FIGS. 1 and 2. Each one of the analog signals represents data from a predetermined different one of the above described sources. The analog signals for each selector 10 are depicted in FIG. 1 as being provided to a well-known eight-pen strip chart recorder 32. Similar recorders having other numbers of pens may be connected to analog signals 30, and these signals may be provided to other recorders or to additional instruments than recorders 32.

A plurality of predetermined digital conversions are required from the 16 bit digital data on bus 21 depending on the particular source whose measurements are represented thereon, and each source associated with one of the analog signals 30 may have any one of these conversions. Each selector 10 provides, in a manner more fully explained below, for three phases of digital data conversion. First, most significant bit (MSB) justification is provided to retain eight bits from least significant bit justified data on bus 21. A binary shift count conversion code portion of four bits is thus sufficient to control the necessary shifting within a range of up to 16 bits for such justification. Second, resulting eight bit data in two's complement arithmetic form, may be scaled upwardly by zero to three bits, with the sign bit being retained. This scaling is used to avoid recalibration of a pen of a recorder 32 to obtain full range. A two bit binary scaling conversion code portion is sufficient to determine such scaling. Third, digital to analog conversion for each one of the signals 30 ultimately requires the use of a common absolute magnitude digital format. Typically, a two bit arithmetic format conversion code portion is sufficient to select the necessary conversion for the corresponding original format such as two's complement and/or inverted polarity.

Figure 2:
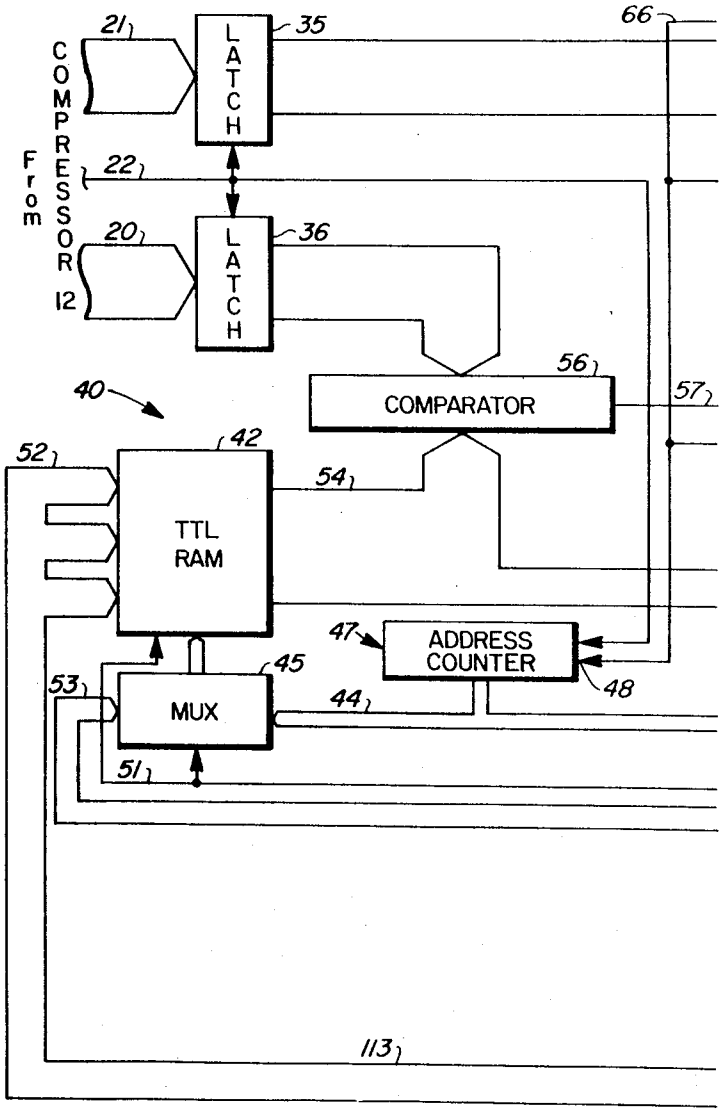
FIG. 2 is a more detailed block diagram of one of the word selectors of FIG. 1.

Referring to FIG. 2, it is seen that word selector 10 has a first latch 35 connected to data bus 21 and a second latch 36 connected to bus 20. Latches 35 and 36 also are connected to request signal connector 22 and are adapted to retain the value of the 16 bit data on the corresponding buses 20 and 21 when a request signal occurs.

Selector 10 has a tag scanner 40 which includes a random access scanning memory 42 having eight, twenty-four bit scanning storage locations corresponding individually to the eight analog signals 30 and uniquely addressably by one of the eight values of a three bit digital address signal 44 provided though a multiplexer 45. Typically, memory 42 utilizes bipolar TTL devices so that it has sufficient speed for the maximum throughput rate of compressor 12. Scanner 40 has a three bit address counter 47 which generates signal 44. Scanner 40 receives the scan request signal via connector 22 as a clear and start signal and has a clock connection 48. Multiplexer 45 and memory 42 receive a load/-scan signal 51 which selects whether memory 42 is to load data from an input bus 52 at an address received from an address bus 53 or is to output data on a twenty-four bit output bus 54 from the scanning storage location determined by the output cf counter 47. Scanner 40 has a comparator 56 which receives the 16 bit tag value from latch 36 and a predetermined 16 bit value from bus 54 and which provides a tag found signal 57 when these values are equal.

The contents and addressing of memory 42 will now be described in greater detail. In a manner subsequently described, memory 42 is loaded with a set of data in which 16 bits of each scanning storage location have a tag signal value which identifies the particular source for which data provided via and tagged by compressor 12 is to be associated with a corresponding one of the analog signals 30. This tag signal value is provided to comparator 56 by bus 54. The remaining eight bits stored in each scanning location are a conversion code identifying the specific conversion phases which provide the digital data conversion for such particular source. A four bit portion of this code is the above described shift count portion and is provided from bus 54 as a signal 60, the remaining four bits being provided as a signal 61 and including the above described two bit scaling conversion code portion and two bit arithmetic format conversion code portion. When the tag signal from latch 36 is being compared with the tag values from memory 42, counter 47 is clocked to generate the values of the eight memory addresses sequentially when started by the request signal on connector 22 so that memory 42 provides sequentially the corresponding scanning location contents to comparator 56 and as signals 60 and 61.

Selector 10 has a clock 65 which outputs a signal 66, typically at 10 MHz when used with the previously noted four bit shift conversion code and maximum data throughput rate of 400 KHz from compressor 12. With this throughput rate connection 48 to three bit counter 47 is clocked at 5 MHz to allow sufficient time for operation of memory 42 and comparator 56. Selector 10 has a first address latch 68, sometimes referred to in the claims as "third latch means". Latch 68 receives the address signal 44 from counter 47 and receives tag found signal 57. Latch 68 retains the value of signal 44 when signal 57 occurs.

Selector 10 has a digital data converter, indicated generally by numeral 70. Converter 70 includes a first conversion value latch 72. Latch 72 receives tag found signal 57 and the four bit signal 61 having the scaling and the arithmetic format conversion portions stored in memory 42 at the location addressed by counter 48. Latch 72 retains the value of signal 61 when signal 57 occurs. Converter 70 includes a data shifting converter 74 having a four bit shift counter 75 and having a shift register 76 with a sixteen bit input and an eight bit output. Counter 75 and register 76 receive tag found signal 57 and clock signal 66 and function together in a well known manner so that the value in counter 75 is successively counted one count following occurance of signal 57 while the value in register 76 is shifted left one digit until the counter reaches a predetermined value, typically zero. When this value is attained, the shifting is terminated and the counter outputs a shift complete signal 77 indicating that MSB justified shifted data value is available from register 76.

Referring in greater detail to shifting converter 70, counter 75 receives the shift count signal 60 from the location of memory 42 addressed by counter 47 when tag found signal 57 occurs while register 76 receives the LSB justified data signal value from latch 35 and serves as a latch for such value when signal 57 occurs. As a result, the value received by register 74 is shifted a number of digits predetermined by signal 60. It is evident that latch 72 and shift counter 75 function together as a latch for retaining the entira eight bit conversion code stored in the location of memory 42 addressed by counter 47 when tag found signal 57 occurs and provide that code for use by data converter 70 in which shift register 76 receives the data signal value from first latch 35.

Converter 70 has a shifted data latch 80 which receives shift complete signal 77 and the shifted data value from register 76 and which retains this value when signal 77 occurs. Signal 77 is also received by a second conversion value latch 82 and a second address latch 84 which are sometimes referred to in the claims as "fourth latch means". Latches 82 and 84 also receive, respectively, the format conversion code portion and the scaling code portion previously retained by latch 72 and the address signal value previously retained by latch 68 and originating from counter 47. Latches 82 and 84 retain their respective values received when signal 77 occurs.

Converter 70 includes a well known scaling circuit 86 which receives the shifted data value from latch 80 and which receives, as indicated by numeral 87, the two bit scaling code portion from latch 82. Circuit 86 performs on the data the above described two's complement scaling as specified by this code portion. Circuit 86 has an eight bit output which is combined with the two bit format conversion code portion from latch 82 to provide a ten bit address, indicated by numeral 88, for a purpose next explained.

Converter 70 has a data format conversion table memory 90 which stores a converted data value for each of the four format conversion code portion values corresponding to each valid shifted data value. The shifted data value corresponds to a digital data value originally provided on bus 21. Memory 90 outputs on a bus 91 the appropriate converted data value when the corresponding location in memory 90 is addressed by address 88. Converter 70 has then performed, on the data signal value from latch 35, the one of the conversions indicated by the appropriate eight bit conversion code stored in memory 42. Typically, memory 90 is a nonvolatile, erasable, programmable read only memory (EPROM) since the data format conversions are unlikely to change. Shift complete signal 77 is provided to a delay circuit 93. At a time after signal 77 occurs sufficient for the outputs of scaling circuit 86 and of memory 90 to settle, circuit 93 outputs a conversion complete signal 94 to a decoder 96 having eight outputs 97. While signal 94 is occurring, a three bit address value corresponding to the storage location of memory 42 which held the tag value identifying the source of the original data corresponding to the now coverted data on bus 91 has been retained in latch 84. The three bit value decoder 96 which is constructed so as to output a select signal on one of its outputs 97 uniquely determined by the address valua and corresponding to the storage location.

Selector 10 has eight digital-to-analog converters (DAC's) 99 of well known construction converters 99 individually correspond to and generate analog signals 30. Each converter 99 receives the coverted digital data on bus 91 and receives one of the outputs 97 of decoder 96. When a signal is provided on this one output, the converter retains this digital data and converts it into the corresponding and so selected one of the analog output signals 30. It is evident that decoder 96 and converters 99 serve to convert the digital value on bus 91 into the one of the signals 30 corresponding to the one of the storage locations of memory 42 addressed by address counter 47 when tag found signal 57 occurred as a result of equality with the tag found value stored in this one location.

Selector 10 has a project storage memory 110. Preferably, memory no is a nonvolatile, electrically erasable programmable read only memory (EEPROM) addressable by a microcomputer address bus 112 and adapted to output to or store data from a microcomputer data bus 113. In a well known manner, buses 112 and 113 extend from any suitable microcomputer system 115. Typically, system 115 includes a project control microprocessor circuit, a random access memory, a nonvolatile EPROM, and input/output circuits. A variety of arrangements of such elements for project control purposes shortly to be described will be apparent to one skilled in the art. Therefore, no particular representation of such elements is shown in the drawings. Microcomputer system 115 is controlled by any suitable program typically stored in such an EPROM and is receptive to signals initiated exteriorly of selector 10, as from a keyboard 116 and a switch 117. System 115 has outputs which include load/scan signal 51 and which drive any suitable display 118. An alphameric liquid crystal display of eighty characters is well suited to a self-contained selector such as selector 10. Address bus 112 and data bus 113 are extended, respectively, to provide the address bus 53 and the input bus 52 associated with memory 42. Memory 42 is thus adapted for loading from memory 110 under control of microcomputer system 115.

Project storage memory 110 is stored with a plurality of the sets of data with which each of the storage locations of scanning memory 42 is loaded. Each such set has the tag signal values and corresponding conversion codes to configure selector 10 for a particular test or test project which provides telemetered data for output as analog signals 30.

OPERATION

The operation of the described embodiment of the subject invention is believed clearly apparent and will now be briefly described. Prior to utilizing a selector 10 with data from compressor 12, project memory 110 is stored with the before mentioned plurality of sets of data to associate the analog signals 30 with eight predetermined sources of telemetry data for each project as identified by tag words on bus 20 and to perform a predetermined conversion on the corresponding data from bus 21. Preferably, the specific twenty-four data bits for each scanned location of memory 42 are generated for storing in memory 110 by any suitable program of microcomputer system 115. This program uses alphameric symbols entered on keyboard 116 and to identify displayed on display 118 to identify a particular project, the tags corresponding to the analog outputs 30, and to identify the shifting, scaling, and arithmetic format conversions. Each such set of data is retained in EEPROM memory 110 until intentionally replaced or modified by such program of system 115. The program is adapted to respond to data input on keyboard 116 and displayed on display 118 to select the set of data in memory 110 corresponding to a desired project. The program is adapted to transfer this set of data to memory 42 by signals sent from system 115 via buses 112 and 53 and buses 113 and 52. When memory 42 is loaded with a predetermined such set, operation of scanner 40 is initiated by manipulation of switch 117 to signal system 115 to output signal 51 to set multiplexer 45 for addressing of memory 42 by counter 47 and to set memory 42 to output on bus 54 when this memory is addressed. Correspondingly, operation of scanner 40 is terminated under control of switch 117 and system 115 by setting the multiplexer for addressing from bus 53. It is apparent that a computer external to a selector similar to selector 10 can be used to control memory 42 and multiplexer 45 and to generate store, and modify sets of data memory 110. However, it can be seen that memory 110 and microcomputer system 115 provide for convenient and rapid reconfiguration of a telemetry system using selector 10 for different test projects and provide convenient generation of programming to select a wide variety of data format and range conversions for each analog output 30.

Selector 10 is adapted to capture and convert data issuing at a rapid rate from compressor 12 into analog signals 30 because digital-to-analog conversion by converters 99, digital data scaling and format conversion by circuit 86 and memory 90, digital data shifting in register 76, and scanning of tag data from bus 20 can proceed in parallel for four different and consecutive data signal words on bus 21. This parallel operation occurs when one of the digital-to-analog converters 99 is converting a digital value from bus 91 corresponding to one such data signal word into the one of the signals 30 corresponding to an address value, which was retained by latch 84 and decoded by decoder 96 to select the digital-to-analog converter, while circuit 86 and conversion table memory 90 are performing, in accordance with the conversion code portions retained in latch 82, a conversion on a digital value from latch 80 corresponding to another such data signal word retained by latch 35 subsequent to the one data word; while register 76 is shifting, in accordance with a shift count coversion code portion retained by counter 78, yet another digital data word which was retained by latch 35 subsequent to such another data word; and while comparator 56 is comparing a tag signal, which corresponds to such a data word retained by latch 35 subsequent to the word being shifted in register 76, with the tag signal values in memory 42.

Obviously, many modifications and variations of the present invention are possible in light of the above teachings. It is, therefore, to be understood that the invention may be practiced within the scope of the following claims other than as specifically described herein.

What is claimed is:

1. A word selector for use with a telemetry system which provides a digital data signal periodically representing successive data words from a plurality of data sources, a digital tag signal indicating the one of said sources corresponding to the one of said data words currently represented by the data signal, and a request signal occurring when there is a valid data signal and a valid tag signal corresponding thereto; which accepts a predetermined number of analog signals individually representing data from the same number of predetermined sources of said plurality thereof; and which utilizes a plurality of predetermined conversions between the value of said data signal and the values of said analog signals with each of said sources utilizing a predetermined one of said conversions, the word selector comprising:

first latch means for retaining the value of the data signal when the request signal occurs;

second latch means for retaining the value of the tag signal when the request signal occurs;

digital scanning memory means, which has a number of storage locations corresponding individually to said analog signals and addressable by digital address values corresponding individually thereto, for storing in and for outputting from each of said locations a tag signal value, which identifies the one of said sources associated with the analog signal corresponding to the location, together with a conversion code identifying the one of said conversions utilized with said one of said sources;

addressing means, which addresses said memory means, for generating said digital address values sequentially when the request signal occurs;

comparator means, which receives the value of said tag signal retained in the second latch means and which receives from said memory means the tag signal value in the one of said storage locations currently addressed by said addressing means, for comparing said values received by the comparator means and for providing a tag found signal when said values are equal;

digital data converter means, which receives the data signal value from the first latch means and which receives the conversion code stored is in the one of said storage locations addressed by the addressing means when the tag found signal occurs, for performing on said data signal value the one of said conversions indicated by said code and for supplying a resulting converted digital value; and digital-to-analog converter means for converting said converted digital value into the one of said analog signals corresponding to the one of said storage locations addressed by the addressing means when the tag found signal occurred as a result of equality with the tag signal value stored in said one of said locations.

2. The word selector of claim 1 wherein the telemetry system is for use with a plurality of test projects differing in that said analog signals represent different predetermined sources of said plurality thereof and wherein the word selector further comprises:

project storage memory means for storing and for outputting for such test projects individually corresponding sets of tag signal values and conversion codes which, when stored in said scanning memory means, associate said analog signals with said predetermined sources; and project control means for selecting a predetermined one of said sets in the project storage memory and for transferring said one set to the scanning memory means.

3. The word selector of claim 2 wherein the project control means is adapted, in response to signals initiated exteriorly of the selector, to generate such sets and to transfer the generated sets to the project storage memory.

4. The word selector of claim 1 wherein said predetermined conversions include shifting said digital data signal within a predetermined range of digits, wherein the number of digits said signal is to be shifted within said range is specified by a shift count which is a portion of the conversion code stored in each location of the scanning memory means, and wherein the digital data converter means comprises:

a shift counter which receives said conversion code portion from the scanning memory means when the tag found signal occurs;

a shift register which receives the data signal value from the first latch when the tag found signal occurs; and means for successively counting said counter one count while shifting said register one digit until the counter attains a predetermined value which terminates such shifting.

5. The word selector of claim 1 wherein said predetermined conversions include arithmetic conversions from a number of original arithmetic formats of said digital data signal to a common digital arithmetic format, wherein said original format for each of of said arithmetic conversions is specified by a portion of the conversion code stored in each location of the scanning memory means, and wherein said data converter means includes conversion table memory means for receiving an address, which includes a digital value corresponding to said digital data signal together with said conversion code portion, and for outputting a converted digital value in said common format from a storage location of said conversion memory means identified by said address.

6. The word selector of claim 1 wherein the data converter means provides a conversion complete signal when said one of said conversions is complete and wherein the word selector further comprises:

third latch means for retaining the one of said digital address values generated by said addressing means when the tag found signal occurs;

fourth latch means for receiving said one of said digital address values from the third latch means, for retaining said one value when said conversion complete signal occurs, and for providing said one value so retained to the digital-to-analog converter means;

fifth latch means for retaining the conversion code stored in the one of said storage locations addressed by said one of the digital addresses when the tag found signal occurs and for providing said code so retained to said data converter means; and sixth latch means for receiving the data signal value retained by the first latch means and for retaining said value when the tag found signal occurs, so that, while the digital-to-analog converter means converts a converted digital value corresponding to a first digital data signal value into the one of the analog signals corresponding to an address value retained by the fourth latch; said digital data converter means performs the conversion indicated by said code retained by the fifth latch means on the data signal value, which is retained by the sixth latch means and which corresponds to a second data signal value retained by the first latch means subsequent to said first signal value; and said comparator means is comparing a tag signal, which corresponds to a third digital data signal value retained by said first latch means subsequent to said second signal value, with tag signal values in said storage locations of the scanning memory means.

7. A telemetry word selector which is for use with a plurality of telemetry projects and receives a digital data signal, a digital tag signal, and a periodically occurring scan request signal and which comprises:

first data latch means for retaining the data signal value existing when the scan request signal occurs;

tag latch means for retaining the tag signal value existing when the scan request signal occurs;

a scanner including scanning memory means having a predetermined number of addressable storage locations for storing in each of said locations a tag signal value, a shift conversion value, and a data format conversion value, address generator means for generating address values for sequentially addressing said storage locations when the scan request signal occurs, and means for comparing the tag signal value from the tag latch with the tag signal values from said memory means as said locations thereof during such addressing and for generating a tag found signal when said tag signal values are equal;

first address latch means for retaining the address value being generated by the address generator means when the tag found signal occurs;

first conversion value latch means for receiving and retaining said format conversion value from the one of said storage locations being addressed by the address generator means when the tag found signal occurs;

data shifting converter means for receiving, when the tag found signal occurs, the data signal value from the first data latch and the shift conversion value from the one of said storage locations being addressed by the address generator means, for shifting said data signal value a number of digits predetermined by said shift conversion value to generate a shifted data value, and for generating a shift complete signal when said shifted data value is available;

shifted data latch means for retaining said shifted data value when the shift complete signal occurs;

second conversion value latch means for receiving and retaining said format conversion value from the first conversion value latch means when the shift complete signal occurs;

second address latch means for receiving and retaining said address value from the first address latch means when the shift complete signal occurs;

data format converter memory means for storing for each format conversion value a converted data value corresponding to each valid shifted data value, and for outputting, when addressed by the shifted data value retained by the shifted data latch means together with the format conversion value retained by the second conversion latch means, a corresponding such converted data value;

analog-to-digital output means, which has a number of analog outputs individually corresponding to said storage locations of the scanning memory means, for receiving said address value retained by the second address latch means and selecting the corresponding one of the analog outputs, for receiving said converted data value from the data format converter memory means, and for converting said data value into an analog value output on the selected one of said analog outputs;

project storage memory means for storing and for outputting, for said plurality of telemetry projects, sets of data individually corresponding thereto and having, for each of said storage locations of the scanning memory means, such a tag signal value, shift conversion value, and data format conversion value; and control means for supplying such sets of data to said project memory means for storage therein, for transferring a selected such set to the scanning memory means, and for initiating and terminating operation of said scanner in comparing said tag signal values.

* * * * *